United States Patent
Ahvenainen et al.

(10) Patent No.: US 7,515,500 B2
(45) Date of Patent: Apr. 7, 2009

(54) MEMORY DEVICE PERFORMANCE ENHANCEMENT THROUGH PRE-ERASE MECHANISM

(75) Inventors: Marko T. Ahvenainen, Ruutana (FI); Kimmo Mylly, Ylöjärvi (FI); Jani Hyvonen, Tampere (FI)

(73) Assignee: Nokia Corporation, Espoo (FI)

( * ) Notice: Subject to any disclaimer, the term of this patent is extended or adjusted under 35 U.S.C. 154(b) by 160 days.

(21) Appl. No.: 11/643,755

(22) Filed: Dec. 20, 2006

(65) Prior Publication Data

US 2008/0155301 A1    Jun. 26, 2008

(51) Int. Cl.
*G11C 8/00* (2006.01)

(52) U.S. Cl. .............................. 365/230.03; 365/230.01; 365/218; 711/103; 711/154; 711/168

(58) Field of Classification Search ............ 365/230.03, 365/230.01, 218; 711/103, 154, 168
See application file for complete search history.

(56) References Cited

U.S. PATENT DOCUMENTS

| 5,530,827 | A | * | 6/1996 | Matsui et al. | 711/103 |
|---|---|---|---|---|---|
| 5,740,396 | A | * | 4/1998 | Mason | 711/103 |
| 5,896,393 | A | * | 4/1999 | Yard et al. | 714/710 |
| 5,907,856 | A | * | 5/1999 | Estakhri et al. | 711/103 |
| 5,966,720 | A | * | 10/1999 | Itoh et al. | 711/1 |
| 5,978,808 | A | * | 11/1999 | Wells et al. | 707/100 |
| 6,081,878 | A | * | 6/2000 | Estakhri et al. | 711/168 |
| 6,144,607 | A | * | 11/2000 | Sassa | 365/230.03 |
| 6,154,808 | A | | 11/2000 | Nagase et al. | 711/103 |
| 6,427,186 | B1 | | 7/2002 | Lin et al. | 711/103 |
| 6,584,579 | B1 | * | 6/2003 | Komatsu et al. | 714/7 |
| 6,611,907 | B1 | * | 8/2003 | Maeda et al. | 711/170 |
| 6,694,402 | B1 | * | 2/2004 | Muller | 711/103 |
| 6,725,321 | B1 | * | 4/2004 | Sinclair et al. | 711/103 |
| 6,757,806 | B2 | * | 6/2004 | Shim | 711/203 |
| 6,829,674 | B2 | * | 12/2004 | Maeda et al. | 711/103 |
| 7,062,618 | B2 | * | 6/2006 | Tsunoda et al. | 711/154 |
| 7,143,261 | B2 | * | 11/2006 | Maeda et al. | 711/170 |

FOREIGN PATENT DOCUMENTS

EP    1 139 210 A1    4/2001
WO    WO 2006/088723    8/2006

OTHER PUBLICATIONS

U.S. Appl. No. 10/656,888, filed Sep. 5, 2005, Jukka-Pekka Vihmalo, et al.

* cited by examiner

*Primary Examiner*—Viet Q Nguyen
(74) *Attorney, Agent, or Firm*—Ware, Fressola, Van Der Sluys & Adolphson LLP

(57) ABSTRACT

The specification and drawings present a new method, apparatus and software product for performance enhancement of a memory device (e.g., a memory card) using a pre-erase mechanism. The memory device can be, e.g., a memory card, a multimedia card or a secure digital card, etc. A new command or commands can be used to inform a memory device controller when the data in one particular sector, allocation unit or block can be deleted. Using that information the memory device controller then can be able to do some internal maintenance, e.g., by moving valid data from a fragmented erase block to another so that the fragmented erase block can be cleared and erased for future use as well as performing effective wear leveling maintenance and write performance optimization.

26 Claims, 2 Drawing Sheets

MEMORY DEVICE PERFORMANCE ENHANCEMENT THROUGH PRE-ERASE MECHANISM

TECHNICAL FIELD

The present invention relates generally to memory devices and more specifically, to their performance enhancement with a pre-erase mechanism.

BACKGROUND ART

Existing memory card interfaces efficiently hide the used memory technology. This can be beneficial from the host software implementation point of view because host software doesn't have to adapt to various memory technologies and architectures. However, this poses a problem that memory cards are not able to efficiently handle the wear leveling and pre-erase functions. For example, if the memory card is once written full, it will internally appear as full even if all the files that were stored in it will be deleted. The reason for this is that in a normal file system implementation, data will just be written to the memory card and new data will just overwrite the old one. Files are deleted only from the file allocation table by writing the reserved file/cluster entries to be non-reserved. In theory it is possible to erase a block of data from the memory card. However, this is not very useful since the erase is normally done in fairly large blocks, not on allocation unit granularity in which the file system operates.

DISCLOSURE OF THE INVENTION

According to a first aspect of the invention, an apparatus, comprises: a memory controller, responsive to a command signal comprising one of: a) an erase start address indicating a logical address of one sector or block, and b) an erase start address and an erase end address indicating a memory area with logical addresses of a plurality of sectors or blocks, the memory area comprising the plurality of sectors or blocks, for marking the one sector or block or the memory area as deleted and storing the logical address or the logical addresses in response to the command signal to further perform maintenance; and a multi-block memory, comprising the one sector or block or the plurality of sectors or blocks.

Further according to the first aspect of the invention, the memory controller may comprise: a memory maintenance controller, for performing the maintenance, wherein the maintenance comprises of erasing the one sector or block or the plurality of sectors or blocks if the one sector or block or the plurality of sectors or blocks are needed for storing further information in the multi-block memory or after receiving an erase command from a host device.

According further to the first aspect of the invention, the maintenance may comprise at least one of: a) performing memory wear leveling of the multi-block memory using the one sector or block or the plurality of sectors or blocks after marking the one sector or block or the plurality of sectors or blocks as deleted, and b) collecting together all sectors after being marked as deleted and erasing the all sectors including the one sector or the plurality of sectors.

According further to the first aspect of the invention, the command signal may be provided by a host device, wherein the host device may comprise an interface configured for connecting and disconnecting the apparatus. Further, the host device may be a mobile phone, an electronic device, a portable device, a wireless device, a person digital assistant, a computer. Further still, the apparatus may be implemented as a memory card, a multimedia card or a secure digital card.

Still further according to the first aspect of the invention, an integrated circuit may comprise all or selected modules of the apparatus.

According further to the first aspect of the invention, the apparatus may be implemented as an embedded memory.

According to a second aspect of the invention, a method, comprises: providing to a memory device a command signal comprising one of: a) an erase start address indicating a logical address of one sector or a block of a multi-block memory of the memory device, and b) an erase start address and an erase end address indicating a memory area of the multi-block memory with logical addresses of a plurality of sectors or blocks, the memory area comprising the plurality of sectors or blocks; and marking the one sector or the memory area as deleted and storing the logical address or the logical addresses in the memory device in response to the command signal to further perform maintenance.

According further to the second aspect of the invention, the method may further comprise as a part of the maintenance: erasing the one sector or block or the plurality of sectors or blocks, if the one sector or the plurality of sectors are needed for storing further information in the multi-block memory or after receiving an erase command from a host device.

Further according to the first aspect of the invention, the method may comprise, as a part of the maintenance, at least one of:
  a) performing memory wear leveling of the multi-block memory using the one sector or block or the plurality of sectors or blocks after marking the one sector or block or the plurality of sectors or blocks as deleted, and
  b) collecting together all sectors after being marked as deleted and erasing the all sectors including the one sector or the plurality of sectors.

Further according to the second aspect of the invention, the command signal may be provided by a host device.

Still further according to the second aspect of the invention, the host device may be a mobile phone, an electronic device, a portable device, a wireless device, a person digital assistant or a computer.

According to a third aspect of the invention, a computer program product comprises: a computer readable storage structure embodying computer program code thereon for execution by a computer processor with the computer program code, wherein the computer program code comprises instructions for performing the second aspect of the invention, indicated as being performed by any component or a combination of components of the memory device.

According to a fourth aspect of the invention, a system, comprises: a host device, for providing a command signal comprising one of: a) an erase start address indicating a logical address of one sector or block of a multi-block memory, and b) an erase start address and an erase end address indicating a memory area of the multi-block memory with logical addresses of a plurality of sectors or blocks, the memory area comprising the plurality of sectors or blocks; and a memory device, for marking the one sector or the memory area as deleted and storing the logical address or the logical addresses in the multi-block memory in response to the command signal to further perform maintenance, wherein the memory device comprises the multi-block memory.

According further to the fourth aspect of the invention, the memory device may comprise a memory maintenance controller, for performing the maintenance, wherein the maintenance may comprise of erasing the one sector or block or the plurality of sectors or blocks if the one sector or block or the plurality of sectors or blocks are needed for storing further information in the multi-block memory or after receiving an erase command from the host device.

Further according to the fourth aspect of the invention, the maintenance may comprise at least one of:
a) performing memory wear leveling of the multi-block memory using the one sector or block or the plurality of sectors or blocks after marking the one sector or block or the plurality of sectors or blocks as deleted, and
b) collecting together all sectors after being marked as deleted and erasing the all sectors including the one sector or the plurality of sectors.

Still further according to the fourth aspect of the invention, the memory device may be a memory card, a multimedia card or a secure digital card.

According further to the fourth aspect of the invention, the memory device may be an embedded memory.

According still further to the fourth aspect of the invention, the host device may be a mobile phone, an electronic device, a portable device, a wireless device, a person digital assistant, a computer.

According to a fifth aspect of the invention, an apparatus, comprises: means for controlling, responsive to a command signal comprising one of: a) an erase start address indicating a logical address of one sector or block, and b) an erase start address and an erase end address indicating a memory area with logical addresses of a plurality of sectors or blocks, the memory area comprising the plurality of sectors or blocks, for marking the one sector or the memory area as deleted and storing the logical address or the logical addresses in response to the command signal to further perform maintenance; and means for storing, comprising the one sector or block or the plurality of sectors or blocks.

According further to the fifth aspect of the invention, the means for controlling may be a memory controller and the means for storing may be a multi-block memory.

BRIEF DESCRIPTION OF THE DRAWINGS

For a better understanding of the nature and objects of the present invention, reference is made to the following detailed description taken in conjunction with the following drawings, in which.

MODES FOR CARRYING OUT THE INVENTION

Figure 1:
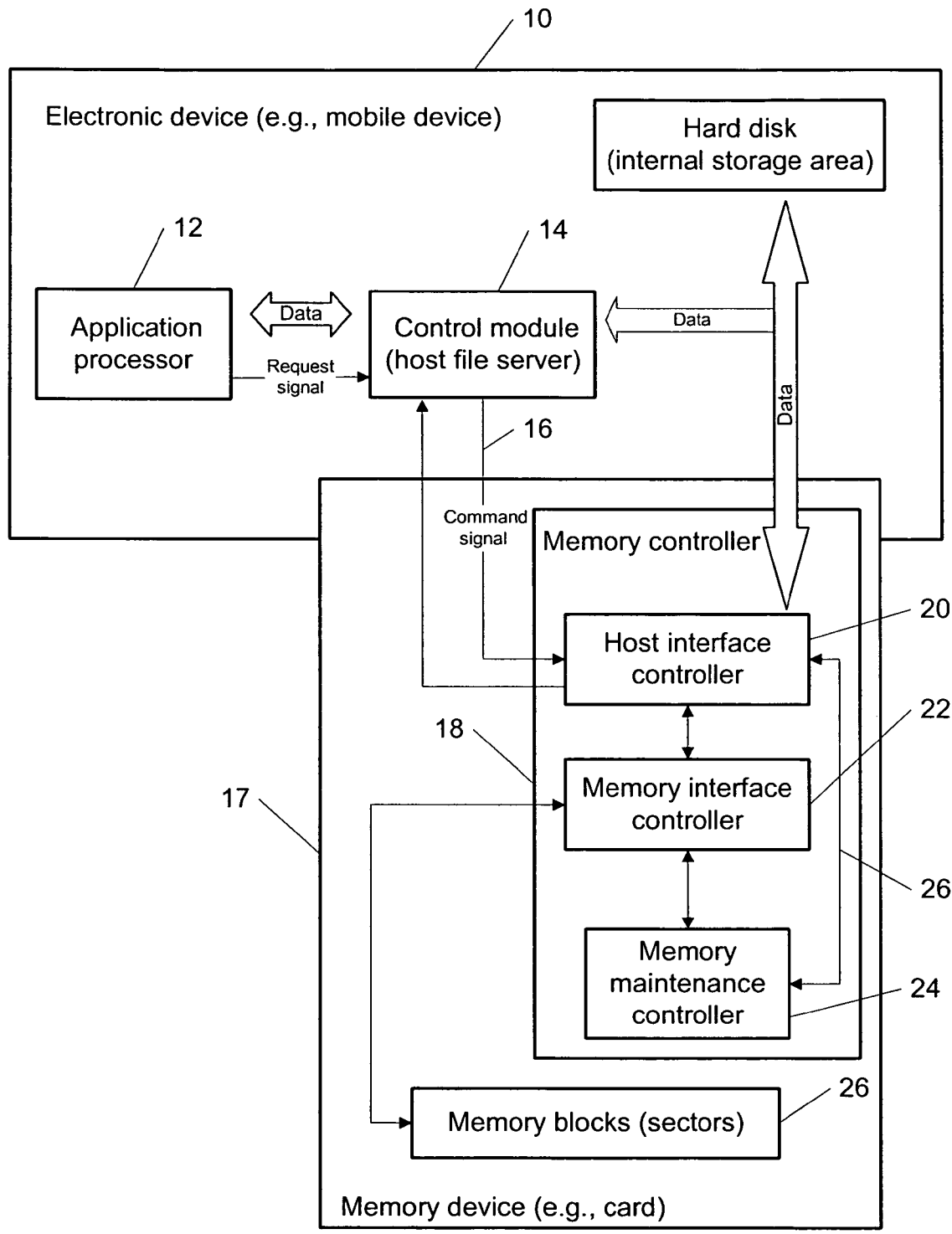
FIG. 1 is a block diagram of a memory device (e.g., a memory card) with a host device for performance enhancement using a pre-erase mechanism, according to an embodiment of the present invention.

A new method, apparatus and software product for performance enhancement of a memory device (e.g., a memory card) using a pre-erase mechanism. The memory device can be (but is not limited to): a memory card, a multimedia card or a secure digital card, or an embedded memory, etc. A new command or commands can be used to inform a memory device controller when the data in one particular sector, allocation unit or block can be deleted. Using that information, the memory device controller then can be able to do some internal maintenance (house keeping), e.g., by moving valid data from a fragmented erase block to another so that the fragmented erase block can be cleared and erased for future use as well as performing effective wear leveling maintenance and write performance optimization.

For example, according to one embodiment, the memory device can be provided by a host device with a command signal comprising one of: a) an erase start address indicating a logical address of one sector or block of a multi-block memory of the memory device to be marked by the memory device as deleted (a block of the multi-block memory comprises several sectors), and b) an erase start address and an erase end address indicating a memory area of the multi-block memory with logical addresses of a plurality of sectors or blocks to be marked by the memory device as deleted, wherein the memory area comprises said plurality of sectors or blocks. It is noted that said memory area of the multi-block memory can be also identified by the erase start address and a block count parameter, which is for the purpose of the present invention, is equivalent to providing the erase start address and the erase end address. In response to this command signal, the logical address of the one sector or block or the logical addresses of the plurality of said sectors or blocks in the memory device can be marked and stored for further maintenance.

Moreover, the maintenance can comprise of erasing said one sector or block or said plurality of sectors or blocks, if the one sector or block or the plurality of sectors or blocks are needed for storing further information in the multi-block memory (e.g., during write operation) or after receiving the appropriate command from the host device (whichever is first). Furthermore, after said erasing, the maintenance can further comprise at least one of: a) performing memory wear leveling of the multi-block memory using said one sector or block or said plurality of sectors or blocks after their erasing, and b) collecting together all marked for deletion and/or erased sectors (i.e., performing garbage collection) including said one sector or said plurality of sectors for freeing one or more blocks in the multi-block memory for future use. It is noted that after collecting together the sectors marked for deletion (but not erased yet), these sectors can be erased when needed or after receiving the appropriate further command from the host device (e.g., in NAND memories).

Furthermore, the command signal (and the further command signal) can be provided by a host device, wherein the host device comprises an interface configured for connecting and disconnecting the memory device. The host device can be (but is not limited to): a mobile phone, an electronic device, a portable device, a wireless device, a person digital assistant, a computer, etc.

According to embodiments of the present invention, several approaches can be used for providing the command signal by the host device to the memory device.

One approach is to use a new MMC (multimedia card) command DELETE_MULTIPLE_BLOCK (e.g., CMD31), wherein the first address (block) to be deleted is used as an argument. Before sending this command a SET_BLOCK_COUNT (CMD23) will be sent for indication of how many consecutive blocks will be deleted.

Another approach is to use a new command DELETE_BLOCKS. An argument will be sent as a data block using data lines. This data block can contain a list of sectors/blocks to be deleted.

Yet another approach is to use existing erase commands as a basis for the solution, i.e., existing MMC commands ERASE_GROUP_START (CMD35), ERASE_GROUP_END (CMD36) and ERASE (CMD38) or existing SD (secure digital) card commands ERASE_WR_BLK_START (CMD32), ERASE_WR_BLK_END (CMD33) and ERASE (CMD38). Currently both MMC and SD card protocols define the erase sequence to be as follows: 1. Erase start address is given. 2. Erase end address is given. 3. Erase is issued. As stated herein, the command which defines the erase start address (if sent alone) would lead the sector or block in question to be marked as deleted by the memory card. The sector/block is marked as deleted even if other commands than erase end address follow the erase start address. Moreover, if the erase start address is sent first followed by the erase end address (if sent without erase command) this would lead the sectors (or blocks) inside the defined memory area to be marked as deleted by the memory card. Sectors/blocks are marked as deleted if other than erase commands follow the erase end address.

The erase command defined in both SD and MMC protocols can inform the card to erase all the sectors marked as deleted, but as stated herein, the deletion can occur even without the erase command from the host device by the memory device itself. Also a garbage collection scheme can be performed after the deletion. Garbage collection here means collecting all the deleted sectors together freeing as many erasable blocks as possible. The erase and garbage collection scheme can be run on the background when there is no access to the media is taking place. The internal erase and garbage collection procedure in the memory device (e.g., memory card) can be interrupted when access to the memory device is issued. When sector/block or sectors/blocks are marked as deleted, the memory device in question can re-use these sector/block or sectors/blocks for internal wear leveling purposes. There are many memory wear leveling techniques which can be used (e.g., see U.S. patent application "Memory Wear Leveling" by Jukka-Pekka Vihmalo, Marko Ahvenainen and Jakke Makela, filed Sep. 5, 2005, application Ser. No.: 10/656,888) Actually, this IP relates to another type of wear leveling (reducing so called hot-spot read wearout) and is not useful for this application.

Memory device/card performance and durability can be improved by applying various embodiments of the present invention. For example in the case where the memory card is 90% full, the rest of the card will be written continuously. If all writes happen on the 10% of the card it will wear out the card prematurely. Being able to tell the memory device controller which of the sectors/blocks is really used it can then move some static data to another area so that the wear will be evenly distributed.

FIG. 1 shows one example among others of a block diagram of a memory device (e.g., a memory card) 17 using a pre-erase mechanism described herein, according to embodiments of the present invention. The memory device 17 can comprise a memory controller 18 and memory blocks (or a multi-block memory) 26 with multiple sectors. The memory controller 18 can comprise a host interface controller 20 for facilitating all communications with the host device 10, a memory interface controller 22 for facilitating all communications and operations (e.g., read, write or erase operations) with the memory blocks 26 and a memory maintenance controller 24. The memory device 17 can be (but is not limited to): a memory card, a multimedia card (MMC) or a secure digital (SD) card, an embedded memory, etc.

When the memory device 17 is connected to a host (electronic) device 10, the control module 14 can provide a command signal 16 to the host interface controller 20. As described herein, the command signal 16 can comprise one of: a) an erase start address indicating a logical address of one sector or block of a multi-block memory 26 of the memory device 17 to be deleted, and b) an erase start address and an erase end address indicating a memory area of the multi-block memory 26 with logical addresses of a plurality of sectors or blocks to be deleted, wherein the memory area comprises said plurality of sectors or blocks. In response to this command signal 16, the logical address of the one sector or block or the logical addresses of the plurality of said sectors or blocks in the memory device 17 can be marked and stored for further maintenance in the memory maintenance controller 24 according to the disclosed embodiment of the present invention.

As described herein, the memory maintenance controller 24 can manage a memory maintenance comprising possible erasing said one sector or block or said plurality of sectors or blocks, if the one sector or block or the plurality of sectors or blocks are needed for storing further information in the multi-block memory 26 (e.g., during write operation) or after receiving the appropriate erase command from the host device (whichever is first). Furthermore, after said marking as deleted, the memory maintenance controller 24 can be further configured to perform a) collecting together all-sectors marked as deleted—and possibly erasing the plurality of sectors marked as deleted (i.e., performing garbage collection) including said one sector or said plurality of sectors for freeing one or more blocks in the multi-block memory 26 for future use and/or b) memory wear leveling of the multi-block memory 26 using said one sector or block or said plurality of sectors or blocks after their deleting.

According to a further embodiment of the present invention, the modules 18, 20, 22, 24 or 26 can be implemented as a software, a hardware module or a combination thereof. Furthermore, each of the modules 18, 20, 22, 24 or 26 can be implemented as a separate module/block or can be combined with any other standard module/block of the memory device 17, or it can be split into several blocks according to their functionality. All or selected modules/blocks of the memory device 17 can be implemented using one integrated circuit.

Figure 2:
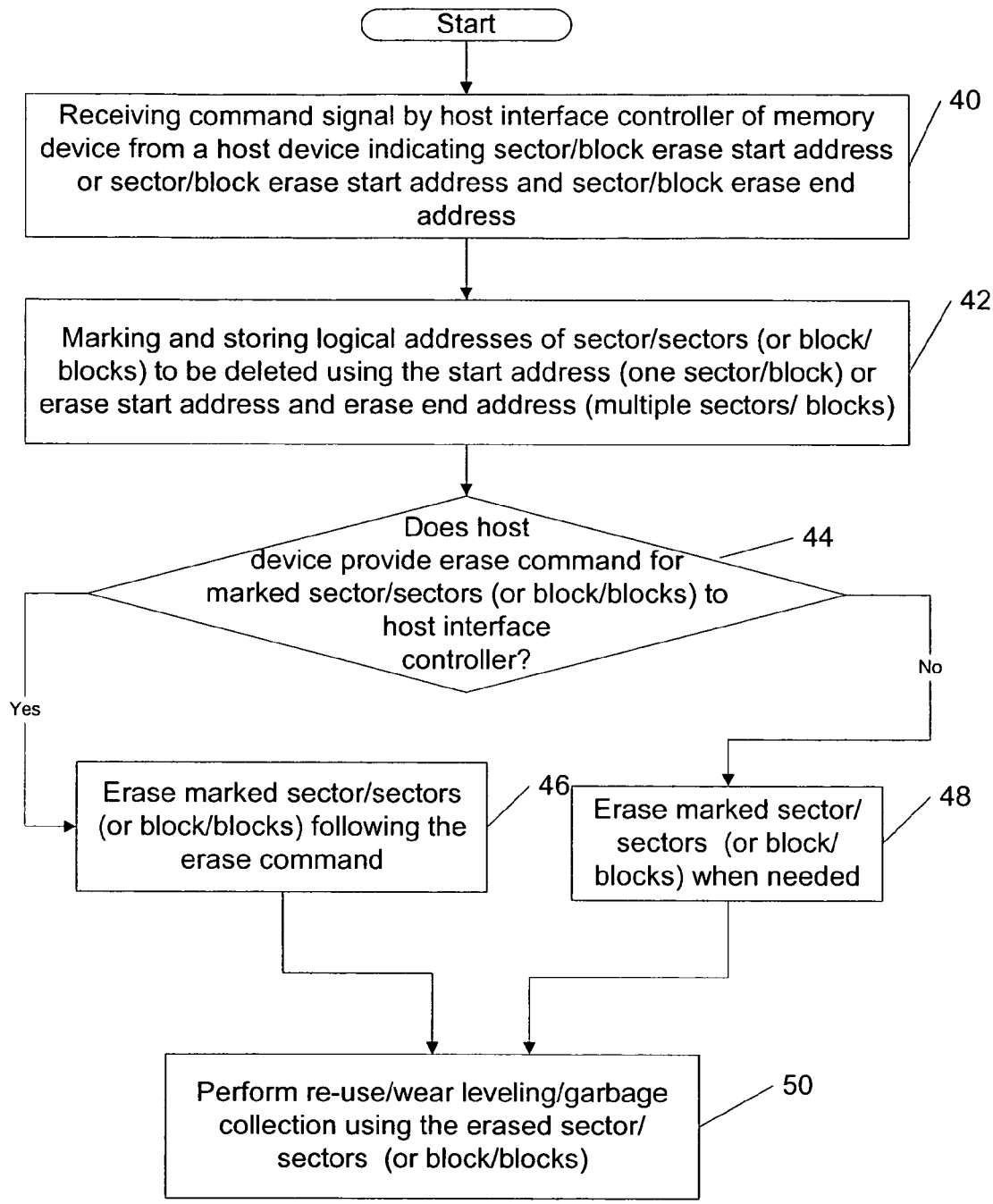
FIG. 2 is a flow chart illustrating performance enhancement of a memory device (e.g., a memory card) using a pre-erase mechanism, according to an embodiment of the present invention.

FIG. 2 shows a flow chart illustrating performance enhancement of a memory device 17 using a pre-erase mechanism, according to an embodiment of the present invention.

The flow chart of FIG. 2 only represents one possible scenario among many others. The order of steps shown in FIG. 2 is not absolutely required, so generally, the various steps can be performed out of order. In a method according to an embodiment of the present invention, in a first step 40, the memory device (e.g., the 20 host interface controller 20) receives the command signal from the host device 10 indicating the sector/block erase start address or the sector/block erase start address and the sector/block erase end address. In a next step 42, the logical addresses of sector/sectors (or block/blocks) to be deleted are marked and stored by the memory device 17 (e.g., using the memory maintenance controller 24) using the start address 25 (one sector/block) or the erase start address and the erase end address (multiple/blocks), according to the embodiment of the present invention described herein. In a next step 43, marked sector/sectors (or block/blocks) are collected together as part of the garbage collection. (this step can be also performed or repeated later in the process).

In a next step 44, it is ascertained (as a logical operation) whether the host device 10 provides an erase command for marked sector/sectors (or block/blocks) to the memory device 17 (e.g., to the host interface controller 20). If that is the case, the marked sector/sectors (or block/blocks) are erased following the erase command (step 46) and then the process goes to step 50. However, if it is determined that host device 10 does not provide the erase command for marked sector/sectors (or block/blocks), in a next step 48, the marked sector/sectors (or block/blocks) are erased when needed (e.g., for storing further information in the multi-block memory 26). In a step 50, the memory device 17 (e.g., the memory maintenance controller 24) performs re-use/wear leveling and/or garbage collection (if needed) using the marked for deletion/erased sector/sectors (or block/blocks), as described herein. It is noted that is not necessary for the host device 10 to issue the erase command immediately. The erase command can be issued, for example, before the host device 10 enters a sleep mode. In this case the host device 10 would find out all the areas marked as deleted and would perform the maintenance operation for these areas.

As explained above, the invention provides both a method and corresponding equipment consisting of various modules providing the functionality for performing the steps of the method. The modules may be implemented as hardware, or may be implemented as software or firmware for execution by a computer processor. In particular, in the case of firmware or software, the invention can be provided as a computer program product including a computer readable storage structure embodying computer program code (i.e., the software or firmware) thereon for execution by the computer processor.

Also, it is noted that various embodiments of the present invention recited herein can be used separately, combined or selectively combined for specific applications.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. An apparatus, comprising:
a memory controller, responsive to a first command signal comprising one of: an erase start address indicating a logical address of one sector or block, and an erase start address and an erase end address indicating a memory area with logical addresses of a plurality of sectors or blocks, said memory area comprising said plurality of sectors or blocks, configured to mark said one sector or block or said memory area as deleted in response to said first command signal, responsive to a second command signal, configured to ascertain whether said second command signal is received by the memory controller and configured to erase said one sector or block or said memory area in response to said second command signal, if said second command signal is received.

2. An apparatus of claim 1, further comprising a multi-block memory, which comprises said one sector or block or said plurality of sectors or blocks.

3. The apparatus of claim 2, wherein said memory controller comprises:
a memory maintenance controller, configured to erase said one sector or block, or said plurality of sectors or blocks if said second command signal is not received when said one sector or block, or said plurality of sectors or blocks are needed for storing further information in said multi-block memory.

4. The apparatus of claim 3, wherein after marking said one sector or block, or said plurality of sectors or blocks as deleted said memory controller is configured to perform at least one of:
memory wear leveling of said multi-block memory using said one sector or block, or said plurality of sectors or blocks, and
collecting together all marked including said one sector or said plurality of sectors.

5. The apparatus of claim 1, wherein said first command signal and the second command signal are provided by a host device, wherein said host device comprises an interface configured for connecting and disconnecting said apparatus.

6. The apparatus of claim 5, wherein said host device is a mobile phone, an electronic device, a portable device, a wireless device, a person digital assistant, a computer.

7. The apparatus of claim 5, wherein said apparatus is implemented as a memory card, a multimedia card or a secure digital card.

8. The apparatus of claim 1, wherein an integrated circuit comprises all or selected modules of said apparatus.

9. The apparatus of claim 1, wherein said apparatus is implemented as an embedded memory.

10. A method, comprising:
providing a first command signal comprising one of: an erase start address indicating a logical address of one sector or a block of a multi-block memory, and an erase start address and an erase end address indicating a memory area of said multi-block memory with logical addresses of a plurality of sectors or blocks, said memory area comprising said plurality of sectors or blocks;
marking said one sector or said memory area as deleted in response to said first command signal;
ascertaining whether a second command signal is received by a memory controller; and
erasing said one sector or block or said memory area in response to said second command signal, if said second command signal is received by said memory controller.

11. The method of claim 10, further comprising:
erasing said one sector or block, or said plurality of sectors or blocks, if said second command signal is not received when said one sector or said plurality of sectors are needed for storing further information in said multi-block memory.

12. The method of claim 11, wherein after marking said one sector or block, or said plurality of sectors or blocks as deleted the method comprises at least one of:
performing memory wear leveling of said multi-block memory using said one sector or block, or said plurality of sectors or blocks, and
collecting together all marked sectors including said one sector or said plurality of sectors.

13. The method of claim 10, wherein said first command signal and the second command signal are provided by a host device.

14. The method of claim 13, wherein said host device is a mobile phone, an electronic device, a portable device, a wireless device, a person digital assistant or a computer.

15. A computer program product comprising:
a computer readable storage structure embodying a computer program code thereon for execution by a computer processor with said computer program code, wherein said computer program code comprises instructions for performing the method of claim 10.

16. A system, comprising:
a host device, configured to provide a first command signal comprising one of: an erase start address indicating a logical address of one sector or block of a multi-block memory, and an erase start address and an erase end address indicating a memory area of said multi-block memory with logical addresses of a plurality of sectors or blocks, said memory area comprising said plurality of sectors or blocks, and further configured to provide a second command signal; and a memory device, configured to mark said one sector or said memory area as deleted and storing said logical address or said logical addresses in said multi-block memory in response to said first command signal, configured to ascertain whether the second command signal is received by the memory device and configured to erase said one sector or block or said memory area in response to said second command signal, if said second command signal is received, wherein said memory device comprises said multi-block memory.

17. The system of claim 16, wherein said memory device comprises a memory maintenance controller, configured to erase said one sector or block or said plurality of sectors or blocks if said second command signal is not received when said one sector or block or said plurality of sectors or blocks are needed for storing further information in said multi-block memory.

18. The system of claim 17, wherein after marking said one sector or block, or said plurality of sectors or blocks as deleted said memory controller is configured to perform at least one of:
   memory wear leveling of said multi-block memory using said one sector or block, or said plurality of sectors or blocks, and
   collecting together all marked sectors including said one sector or said plurality of sectors.

19. The system of claim 16, wherein said memory device is a memory card, a multimedia card or a secure digital card.

20. The system of claim 16, wherein said memory device is an embedded memory.

21. The system of claim 16, wherein said host device is a mobile phone, an electronic device, a portable device, a wireless device, a person digital assistant, a computer.

22. A controller, comprising:
   a host interface controller, configured to receive a first command signal comprising one of: an erase start address indicating a logical address of one sector or block, and an erase start address and an erase end address indicating a memory area with logical addresses of a plurality of sectors or blocks, said memory area comprising said plurality of sectors or blocks, further configured to receive a second command signal; and
   a memory maintenance controller, configured to mark said one sector or block or said memory area as deleted and to store said logical address or said logical addresses in response to said first command signal, configured to ascertain whether the second command signal is received by the controller and configured to erase said one sector or block or said memory area in response to said second command signal, if said second command signal is received.

23. The controller of the claim 22, further comprising:
   a memory interface controller, configured to provide communications between the memory maintenance controller and a multi-block memory comprising said one sector or block, or said plurality of sectors or blocks.

24. The apparatus of claim 1, wherein said memory controller is configured to store said logical address or said logical addresses.

25. The method of claim 10, wherein said memory controller is configured to store said logical address or said logical addresses.

26. The controller of claim 22, wherein said memory controller is configured to store said logical address or said logical addresses.

* * * * *